H. ECKHARDT.
MUSICAL BUILDING BLOCK.

No. 181,827.  Patented Sept. 5, 1876.

WITNESSES:
H. Rydquist.
John Goethals

INVENTOR:
H. Eckhardt
BY
[signature]
ATTORNEYS.

N. PETERS, PHOTO-LITHOGRAPHER, WASHINGTON, D. C.

UNITED STATES PATENT OFFICE.

HERMAN ECKHARDT, OF COLUMBUS, OHIO.

IMPROVEMENT IN MUSICAL BUILDING-BLOCKS.

Specification forming part of Letters Patent No. 181,827, dated September 5, 1876; application filed July 1, 1876.

*To all whom it may concern:*

Figure 1:
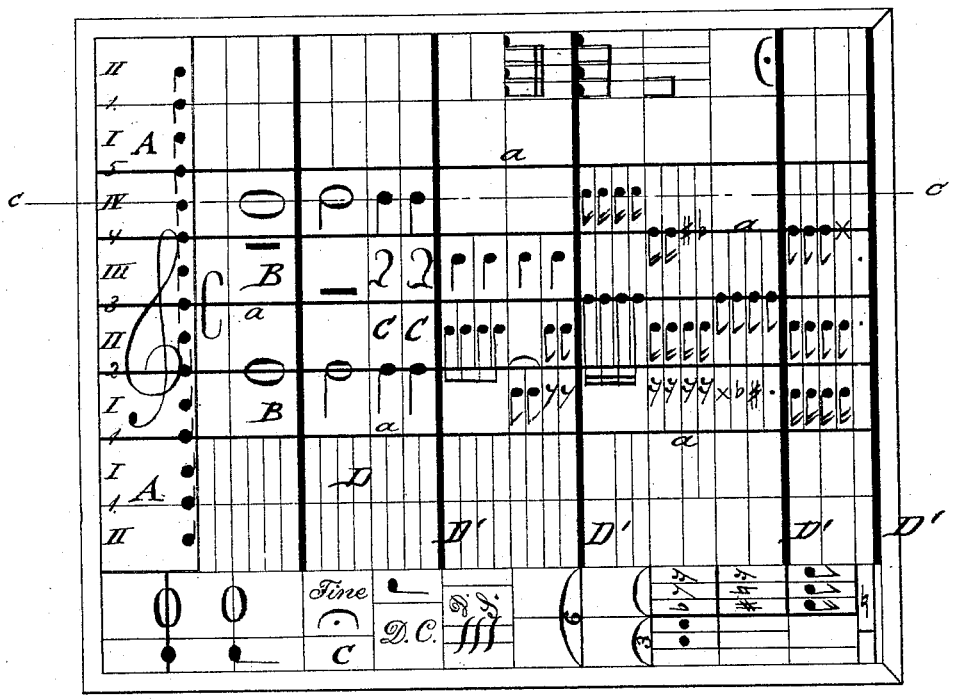
Figure 2:
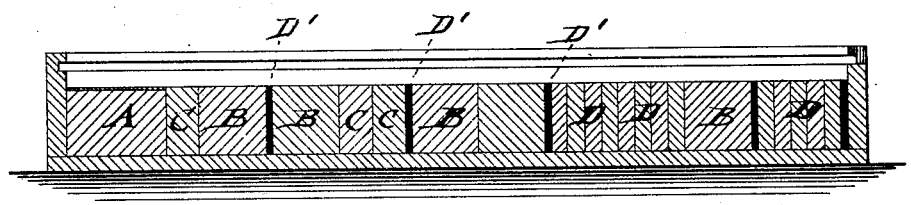
Figure 3:
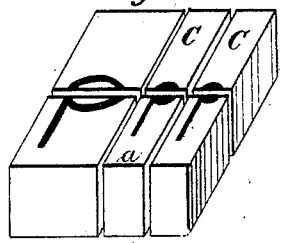

Be it known that I, HERMAN ECKHARDT, of Columbus, in the county of Franklin and State of Ohio, have invented a new and useful Improvement in Musical Building-Blocks, of which the following is a specification:

In the accompanying drawing, Figure 1 represents a top view of my improved musical building-blocks; and Fig. 2, a vertical longitudinal section of the same on line $c\ c$, Fig. 1. Fig. 3 is a detail view.

Similar letters of reference indicate corresponding parts.

The object of my invention is to furnish to children, as an instructive and entertaining toy or game, a system of musical building-blocks, by which almost any piece of music of a certain number of bars may be set up to be played, so that the blocks serve thereby as a means of theoretical instruction in music.

The invention consists of a clef-block, a series of cubical, semi-cubical, and quarter blocks, with the different notes, characters, and signs used in music placed thereon, and of thin strips, that divide the blocks and indicate the measures. The staff is indicated by edge-lines of the blocks.

In the drawing, A represents a clef-block, that is equal in length to the height of the staff and the added spaces above and below the staff. The clef-block A contains the G-clef, with the lines and spaces numbered, together with the name of the notes upon the lines and spaces, and other information on one side, and the bass-clef, &c., on the other side. The clef-block A forms the rest or support, against which the other blocks are placed in building any piece of music. The different musical notes, rests, characters, and signs are placed on blocks of varying sizes, proportioned to the duration of the same—the cubical blocks B containing whole and half notes, and whole and half rests, on lines and spaces; the semi-cubical blocks C, quarter notes and rests on lines and spaces; and the quarter-blocks D, eighth and sixteenth notes and rests on lines and spaces, and all the other musical characters, as sharps, flats, naturals, dots, &c. The blocks B C D are provided with black edge-lines $a$, that form the lines of the staff in setting up the music, some of the sides remaining without signs or edge-lines, to serve to fill up the spaces above and below the staff. The measures are indicated by means of thin strips D', of black or other colored wood, that are interposed between the blocks to form the division of the bars. A number of measure-strips, B, are provided, in proportion to the number of blocks and bars that may be set up with the same. Any piece of music may be readily set up by selecting the required notes, rests, and sign-blocks, and filling up with the remaining blocks, separating the blocks by the measure-strips, in the manner indicated in Fig. 1, and forming thus a neat and interesting game apparatus for teaching the theoretical part of music.

I am aware that it is not new to place the notes permanently upon lines or spaces on the staff; but under my invention each note may be placed at any point on the staff, and double notes and chords may be formed.

I am aware that musical signs and characters have before been used upon blocks, and such, broadly, I do not claim; but What I do claim as my invention is—

1. A musical game apparatus, consisting of clef-block A, extending above and below the staff, a series of blocks differing in size, and marked with signs, lines, and characters of the staff, and the dividing measure-strips D, arranged to operate substantially as and for the purpose specified.

2. A musical building-block, provided on some of the sides with musical characters or signs, and with edge-lines to form the horizontal or staff lines, substantially as and for the purpose described.

HERMAN ECKHARDT.

Witnesses:
 MINA SENTER,
 F. F. D. ALBERY.